United States Patent [19]

O'ffill

[11] Patent Number: 5,580,406
[45] Date of Patent: Dec. 3, 1996

[54] SURFACING OR REHABILATING STRUCTURES WITHOUT SUPPORTING FORMS

[75] Inventor: Robert J. O'ffill, San Clemente, Calif.

[73] Assignee: Ameron, Inc., Pasadena, Calif.

[21] Appl. No.: 356,847

[22] Filed: Dec. 15, 1994

[51] Int. Cl.⁶ .......................... B32B 35/00; F61L 55/162
[52] U.S. Cl. .............................. 156/94; 138/98; 156/294; 264/36; 264/269
[58] Field of Search .......................... 156/94, 293, 294; 264/36, 269, 270; 138/97, 98

[56] References Cited

U.S. PATENT DOCUMENTS

| | | |
|---|---|---|
| 2,794,758 | 6/1957 | Harper et al. . |
| 3,087,515 | 4/1963 | Venable ................................. 264/270 |
| 3,132,062 | 5/1964 | Lang et al. . |
| 3,232,812 | 2/1966 | Lorentz ................................. 156/293 |
| 4,170,248 | 10/1979 | Bennett et al. . |
| 4,401,696 | 8/1983 | Wood ................................. 427/238 |
| 4,764,237 | 8/1988 | Shishkin ................................. 156/294 |
| 4,792,493 | 12/1988 | Bertram ................................. 428/911 |
| 4,995,929 | 2/1991 | Menzel ................................. 156/294 |
| 5,101,863 | 4/1992 | Fujii et al. . |
| 5,102,263 | 4/1992 | Allen et al. . |
| 5,190,705 | 3/1993 | Corazza ................................. 264/36 |

FOREIGN PATENT DOCUMENTS

| | | | |
|---|---|---|---|
| 3801471 | 8/1989 | Germany ................................. | 138/97 |
| 8204847 | 7/1984 | Netherlands ................................. | 138/97 |

*Primary Examiner*—Daniel J. Stemmer
*Attorney, Agent, or Firm*—Christie, Parker & Hale, LLP

[57] ABSTRACT

A flexible liner is formed from a resilient material and includes a back side surface having a number of ribs that project outwardly a distance away from the liner. The ribs each have an enlarged profile configured to provide a strong mechanical lock with an intermediate adhesion layer or carrier that is applied to a surface portion of the underlying substrate needing surfacing or rehabilitation. The liner is installed to surface or rehabilitate a structure by applying a thickness of the carrier to the wall section of the underlying substrate, positioning a back side surface of the liner adjacent the carrier, pressing the liner against the carrier so that the ribs are inserted and completely covered by the carrier, and forming a mechanical lock between the ribs and the carrier. The carrier is formed from a resinous material that has good adhesion properties and that displays good chemical and/or corrosion resistance when cured. The carrier cures to form a strong bond with the surface of the underlying substrate but not with the back side surface of the liner. The ribs are disposed within the carrier and are mechanically lock therein by curing action of the carrier.

10 Claims, 5 Drawing Sheets

SURFACING OR REHABILATING STRUCTURES WITHOUT SUPPORTING FORMS

FIELD OF THE INVENTION

The present invention relates generally to a device and method for surfacing or rehabilitating concrete structures such as pipelines, manholes, monolithic structures and the like, and, more particularly, to a method for surfacing or rehabilitating concrete structures without having to use supporting forms or props to effect such surfacing or rehabilitation.

BACKGROUND OF THE INVENTION

Concrete structures such as pipelines and manholes that are buried beneath the surface are difficult and costly to replace and, therefore, are repaired or rehabilitated when leaks develop in such structures. For example, repairing sewer pipes which have developed leaks has proven to be an expensive operation, normally involving disruption of sewer services. One of the most common solutions has been to dig up the section of leaking sewer pipe and then replace it with new pipe which is suitably attached to the existing sewer pipe. However, the expense of this method is readily apparent, especially in urban setting, as is the disruption of sewer service. The same holds true for the replacement of other non-subterranean structures that are formed from concrete that serve to enclose a fluid handling device such as a pump, pipeline, tank and the like.

Concrete structures are particularly susceptible to corrosion and erosion due to contact with or use in transporting liquids that are acidic in nature or that include some amount of solid component, respectively. Over time, the concrete structure subjected to such use will corrode and/or erode, causing wall portions of the structure to be eaten away and ultimately causing the structure to leak. As leaking liquid escapes from a subterranean pipe the ground surrounding the pipe serving as a foundation is eroded away from contact with the pipe, thereby leaving the already structurally weakened pipe without foundational support which may result in catastrophic structural failure.

Devices and methods for in-place surfacing or rehabilitation of concrete structures, to avoid the costly alternative of removal and replacement of such structures, have been developed and are known in the art. For example, U.S. Pat. No. 2,794,758 discloses a method and apparatus for in-place lining of a pipeline to protect the pipeline from the effects of corrosion and erosion. The apparatus comprises a housing that encloses a reel of flexible liner therein. The housing is attached at an outlet end to one end portion of the pipe to be repaired. A liquid pressure source, such as water and the like, is connected to an inlet end of the housing. Liquid entering the housing from the liquid pressure source imposes a pressure against a backside portion of the liner that has been attached at one end to a surface portion of the pipe. Continued exertion of liquid pressure against the liner backside surface causes the liner to unwind from the reel and be displaced through the length of the pipe. As the liner is displaced through the pipe the liquid pressure imposed against the backside surface causes the liner to unfold and be pressed against the wall surface of the pipe. Accordingly, this apparatus and method for repairing a pipeline relies on liquid pressure to dispense and place a flexible liner against the pipe wall portion requiring repair. This apparatus is, however, practically limited to the repair of pipelines only and, more particularly, to pipelines having a relatively small diameter, e.g., on the order of from 5–20 inches in diameter.

U.S. Pat. No. 3,132,062 discloses a method of in-place lining of conduit. The method comprises using a version of the housing and reel apparatus disclosed in U.S. Pat. No. 2,794,758, discussed above, that has been modified to include adhesive rollers disposed adjacent the housing end portion attached to the pipe. The method is an improvement of the method recited in U.S. Pat. No. 2,794,758, involving applying an adhesive material to the backside surface of the folded liner as the liner is being dispensed within the pipe to promote adhesion of the liner with an adjacent pipe wall surface. Again, however, this apparatus and method is limited only to the repair of pipelines and, more particularly, to pipelines having a relatively small diameter, e.g., on the order of from 5–20 inches in diameter.

U.S. Pat. No. 4,170,248 discloses a method for repairing sewer pipes by inserting a thin, flexible liner within the sewer pipe. The liner has an outside diameter that is less than the inside diameter of the sewer pipe, thereby forming an annular space therebetween. A top portion of the sewer pipe is removed at one location to expose the liner disposed therein. Packing is inserted at each sewer pipe end portion to seal off the annular opening between the liner and sewer pipe walls. The annular space between the sealed off ends is filled with a low viscosity cement by pouring the cement into a hole surrounding the removed top portion of the sewer pipe such that the cement can freely enter and fill the annular space. The cement is poured to a level above the top of the sewer pipe to provide a hydrostatic head to effect migration of the cement through the annular space between the liner and pipe and to the sealed ends. A overflow tube drilled into the top portion of the sewer pipe near each sealed end portion to provide an indication of whether the annular space is filled. This method, however, is also limited to repairing only pipelines and, more particularly, pipelines that are positioned in a horizontal orientation.

U.S. Pat. No. 4,792,493 discloses a corrosion resistant coating and liner combination used for repairing a water system pipe or reservoir comprising spray applying a polyurethane coating to a surface to be repaired and then adhering a sheet of polyvinyl chloride to the surface of the polyurethane coating. The polyvinyl chloride sheet is prepared for bonding to the surface of the polyurethane by applying a polyurethane primer-activator to the surface of the sheet. The polyvinyl chloride sheet is chemically bonded to the polyurethane coating by reaction of the primer activator and the polyurethane coating to provide a chemically resistant pipe liner. This method, however, does not provide long term leak protection as further cracking of the pipe is transmitted to an adjacent polyvinyl chloride sheet via the polyurethane coating, which causes the sheet to also crack and, thereby, permitting the escape of liquid from the pipe.

U.S. Pat. No. 5,101,863 discloses a method of rehabilitating underground pipes with an expanding helical wound liner. The method involves forming a helical wound liner made from a synthetic resin by winding a continuous strip of the resin around a virtual cylinder, of smaller outside diameter than the inside diameter of a pipe to be repaired, and interconnecting adjacent side edges of the strip together with a removable wire rod. The liner is then inserted into the pipe to be repaired and the leading end of the liner is attached to the inside wall of the pipe. The wire rod is removed, causing the liner to expand against the inside diameter of the pipe. As the wire rod is removed from the liner a device inserted between the outside diameter of the liner and the inside diameter of the pipe deposits a foam back filling material onto the outside surface of the liner. The device deposits the back fill material as it is retracted from the pipe so that such back fill material is applied simultaneously to that section of the liner that is expanded against the pipe wall. This method is also limited to use in repairing only pipelines and, more particularly, is practically limited to repairing pipelines having a relatively moderate diameter in the range of from 12–36 inches in diameter.

U.S. Pat. No. 5,102,263 discloses a method of renovating and/or protecting sewers and pipes comprising forming a liner from lengths of PVC panels, placing the panels around the wall of the pipe, and butt-joining together end portions of panel. The panels are configured having complementary edge configurations so that each panel portion that is butt-joined together may be clipped together along edge portions with an adjacent panel portion. The backside surface of each panel includes T-shaped formations that extend outwardly away from the backside surface to contact an adjacent wall surface of the pipe. If needed, due to corrosion that has eaten away a section of the sewer wall, holes can be drilled in the sewer wall (post installation of the liner) and grout pumped into the cavity between the liner and sewer wall to provide support to the liner. This method is limited in that it applies only the renovation of sewer pipes and, more particularly, to the repair of an entire diameter section of the pipe, due to the interlocking nature of the panels and the lack of attachment means for supporting an individual panel against the sewer wall.

U.S. Pat. No. 5,190,705 discloses a method for lining large-diameter pipes comprising the steps of supporting a tubular lining within the pipe by using supporting props, injecting a hardenable mass into a space between the liner and the inside pipe wall surface, allowing the hardenable mass to cure, removing the props, and repeating the cycle for the next tubular lining section. The tubular liner may include T-shaped formations that extend outwardly away from a backside surface to anchor it solidly to the hardenable mass. This method is limited in that applies only to the repair of pipelines and relies on the use of props to temporarily support the tubular liner in position against the pipe wall surface while the hardenable mass is injected and cured, thereby increasing repair difficulty and the time associate with completing such repair.

It is, therefore, desired that a device be constructed and method be devised to use the device to facilitate the surfacing or rehabilitation of a wide range of concrete structures, including pipes, that serve to contain and/or transport a volume of liquid. It is desired that the device and method be able to accommodate the surfacing or rehabilitation of structures having different geometries and sizes. It is desired that the device and method facilitate quick surfacing or repairs of such structures without having to use forms, props or other specialized equipment to install and/or retain the surfacing or rehabilitating device into place. It is also desired that the surfacing or rehabilitating device be capable of protecting against leakage from the structure in the event of future structure damage.

SUMMARY OF THE INVENTION

There is, therefore, provided in practice of this invention a device for surfacing or rehabilitating structures comprising a flexible liner formed from a resilient material that is preferably chemical and/or corrosion resistant. The liner has a back side surface that includes a number of ribs that project outwardly a distance away from the liner and that are located positioned at repeating intervals. The ribs each have an enlarged profile that is configured to provide a strong mechanical lock with an intermediate adhesion layer or carrier applied to a surface portion of the underlying substrate in need of surfacing or rehabilitation.

The flexible liner is installed to surface or rehabilitate a structure by applying a thickness of the carrier to the wall section of the underlying substrate in need of repair, positioning the back side surface of the liner adjacent the carrier, and pressing the liner against the carrier so that the ribs are inserted and completely covered by the carrier. The carrier is formed from a resinous material that has good thixotropic properties, thereby allowing the user to release the liner after pressing it against the carrier. The carrier is formed from a material that displays good chemical and/or corrosion resistance when cured. The carrier cures to form a strong bond with the surface of the underlying substrate but not with the back side surface of the liner. The ribs are disposed within the carrier and are mechanically locked therein by curing action of the carrier.

The flexible liner of this invention allows for the surfacing or rehabilitation of structures other than pipes that have a number of different geometries and sizes. The carrier of this invention allows for the installation of the liner without the need for external supporting means such as props, forms and the like, thereby reducing installation and/or repair time and repair costs. The carrier of this invention also minimizes the possibility that cracks or tears in the flexible liner will develop, due to subsequent cracks in the underlying pipe wall, because the liner is not bonded to the carrier and, therefore remains flexible and insulated from such underlying cracks.

BRIEF DESCRIPTION OF THE DRAWINGS

These and other features and advantages of the present invention will become appreciated as the same becomes better understood with reference to the specification, claims and drawings wherein:

DETAILED DESCRIPTION

Figure 1:
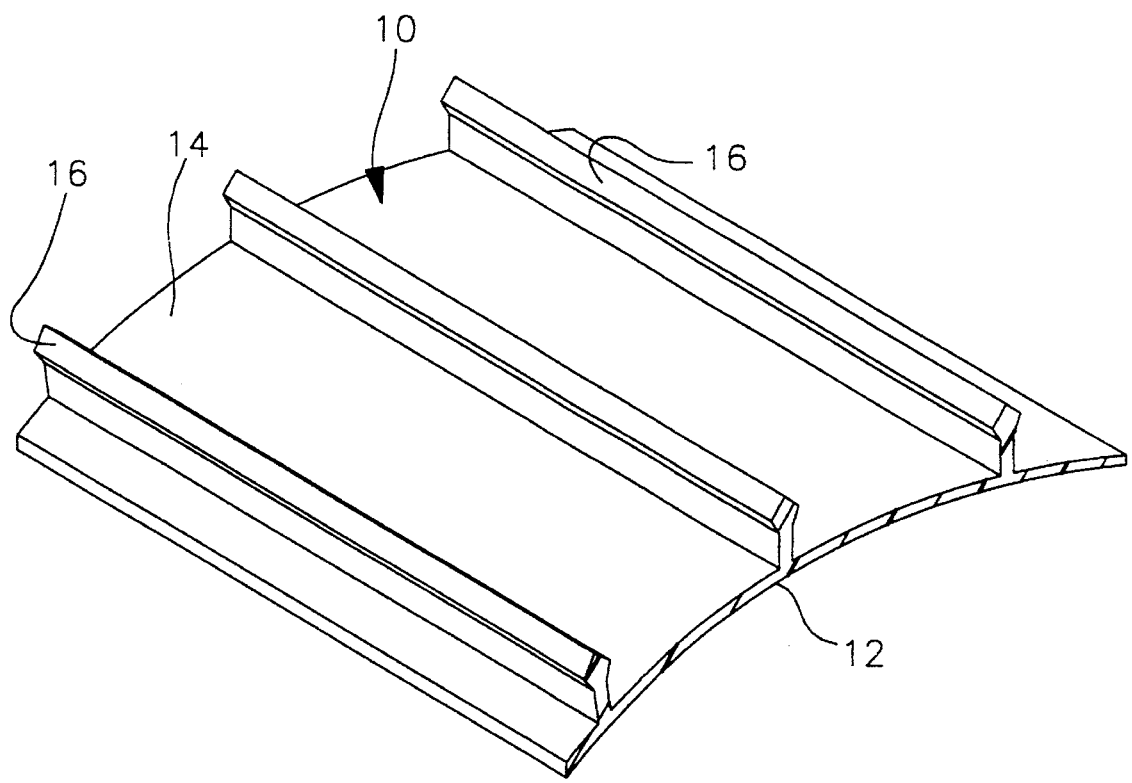
FIG. 1 is a perspective view of a flexible liner constructed in accordance with principles of this invention.

FIG. 1 illustrates a protection or rehabilitation device as constructed according to principles of this invention in the form of a flexible liner 10. The flexible liner is configured in the shape of a flat sheet formed from a resilient material. FIG. 1 illustrates only a section of the flexible liner 10 for purposes of reference and clarity. It is to be understood that the flexible liner may be configured in the form of a sheet having a dimension that is dictated by the particular application. It is desired that the flexible material be formed from a material that displays good chemical and corrosion resistance due to the formation acid species within sewer pipes during use. The acid species are formed from hydrogen sulfide gas ($H_2S$), that is emitted by sewage carried by the pipes, that combines with water to form sulfuric acid ($H_2SO_4$). Because the $H_2S$ gas exists mainly along the top portion of the sewer pipes, the acid species that is formed also collects along the top portion of the sewage pipe, resulting in corrosion damage along 90 to 360 degrees of the pipe. It is, therefore, desired that the flexible liner be made from a corrosion resistant material so that, when installed within the pipe, it can act to protect the pipe top portion from further corrosive damage. Suitable materials for forming the flexible liner include thermoplastic polymers such as polyvinyl chloride (PVC), polyethylene (PE), and polypropylene (PP).

A preferred flexible liner may have a thickness of approximately 1.6 millimeters (1/16 inch) and be formed from PVC. It is desired that the flexible liner have a thickness that both facilitates flexibility, to accommodate a particular substrate geometry, and does not impact the volumetric and/or hydraulic characteristics of the underlying substrate. It is desired that the flexible liner be sufficiently flexible to permit its use in surfacing or rehabilitating different geometrically configured substrates, such as pipes having different diameters, rectangular or square structures having flat surfaces and the like. It is, therefore, intended that application of the flexible liner 10 not be limited to surfacing or rehabilitating substrates in the form of pipes.

The flexible liner 10 has a smooth front side surface 12 that, after installation on the underlying substrate, forms the outer facing surface of the particular substrate. The front side surface may, therefore, be placed in direct contact with the fluid being contained or transported by the substrate. It is desired that the front side surface be smooth so as to not adversely impact the hydraulic characteristics of the underlying substrate.

The flexible liner 10 has a back side surface 14 that includes a number of ribs 16 that each project outwardly a distance away from the back side surface. The ribs 16 are positioned at repeating intervals along the back side surface 14 of the liner and are configured having an enlarged profile 18 at an end portion that facilitates a mechanically locking engagement with an intermediate adhesion layer or carrier that is applied to the substrate surface, as will be discussed in detail below. Accordingly, the primary purpose of the ribs is to provide a mechanically locking engagement with the carrier, rather than to provide an offset from a surface portion of the underlying substrate. In a preferred embodiment, the ribs are spaced apart at approximately 63.5 millimeter (2½ inch) intervals. Although the flexible liner has been described and illustrated having a specific thickness and rib placement interval, it is to be understood that the liner thickness and placement of the ribs may vary according to each particular application.

Figure 2:
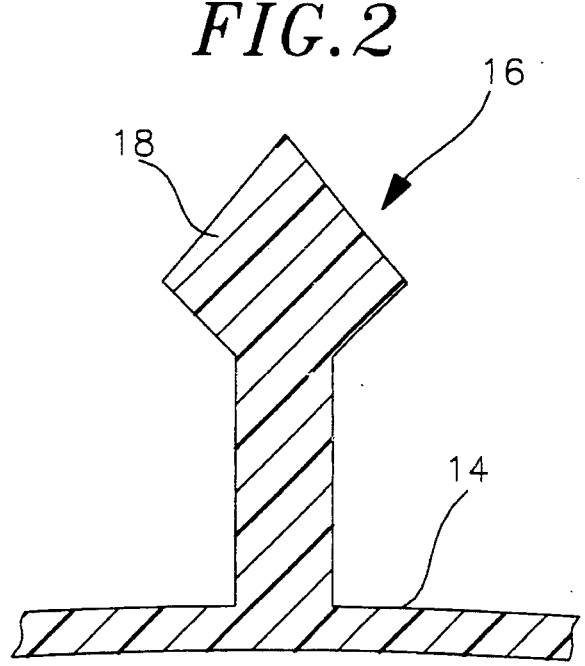
FIG. 2 is an enlarged cross-sectional side elevation of a rib projecting from the flexible liner of FIG. 1.
Figure 3A:
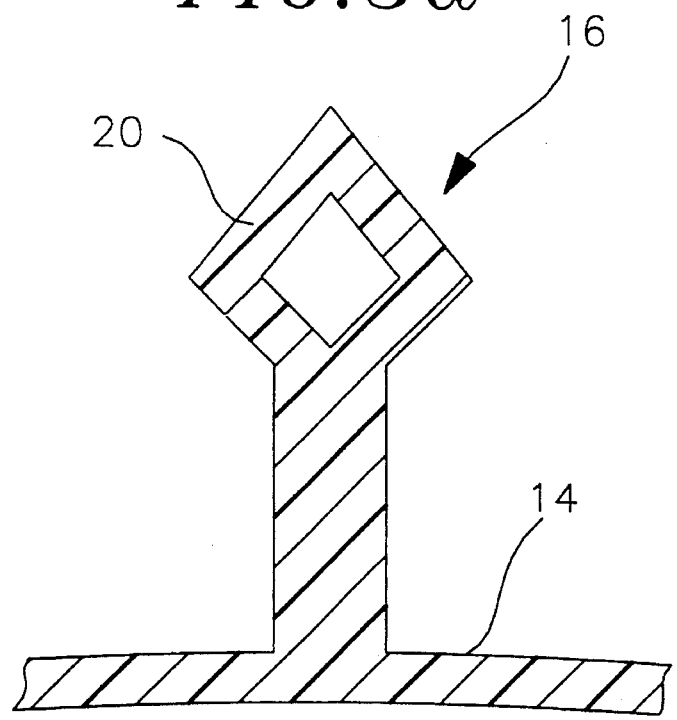
FIGS. 3a–3d are cross-sectional side elevations of different embodiments of ribs constructed according to principles of this invention.
Figure 3B:
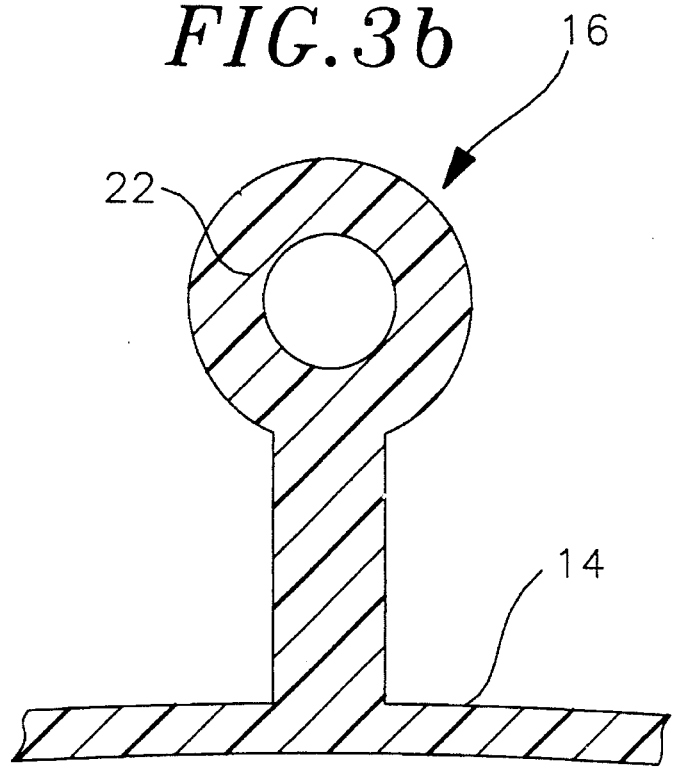
Figure 3C:
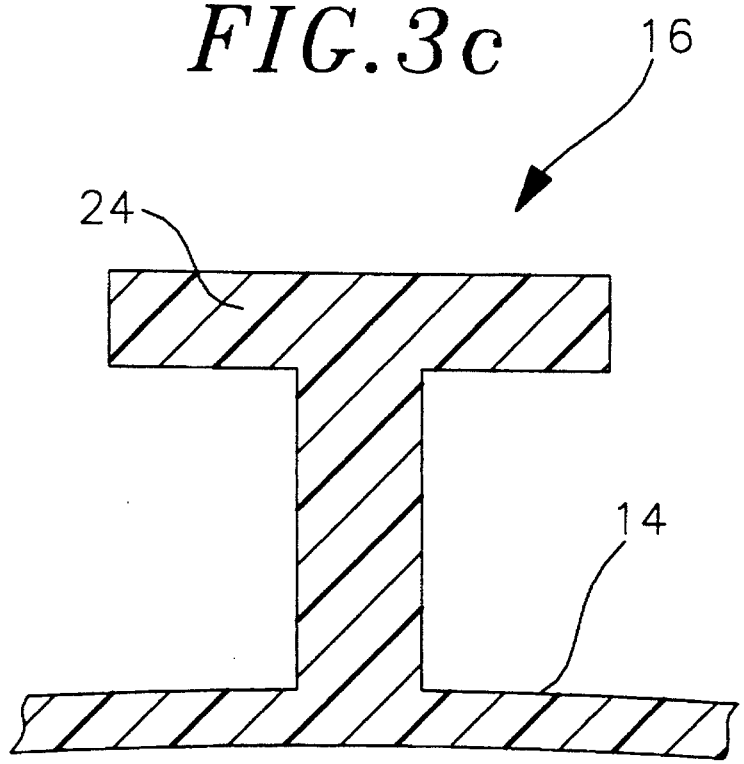
Figure 3D:
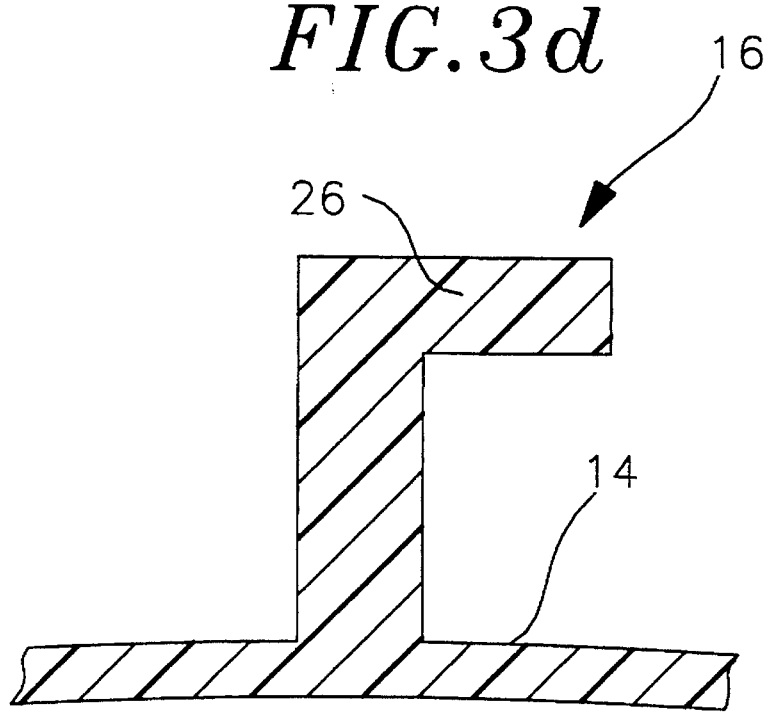

In FIG. 1, the flexible liner 10 is illustrated having ribs 16 having an enlarged profile 18 configured in the shape of a solid arrow having a pointed end portion and flared edge portions (as best shown in FIG. 2) to both facilitate insertion within the carrier and retention of the rib within the carrier after being inserted to form a strong mechanical lock therewith. The ribs 16 can also be configured having differently shaped enlarged profiles 18 such as those shown in FIG. 3a (a hollow arrow shaped profile 20), FIG. 3b (a hollow circle shaped profile 22), FIG. 3c (a "T" shaped profile 24), and FIG. 3d (a right angle or sheep leg shaped profile 26). It is to be understood that the rib configurations specifically described above and illustrated are intended to be representative of the different ways in which the ribs may be configured for purposes of reference and clarity only and, therefore, are not meant to be limiting. For example, the ribs 16 may have enlarged profiles 18 configured having a square, rectangular, or triangular shape. In a preferred embodiment, the ribs 16 have an enlarged profile 18 configured in the shape of a solid arrow, as shown in FIGS. 1 and 2. In a preferred embodiment, each rib 16 projects outwardly away from the back side surface 14 a distance of approximately 9.5 millimeters (3/8 inch).

Figure 4:
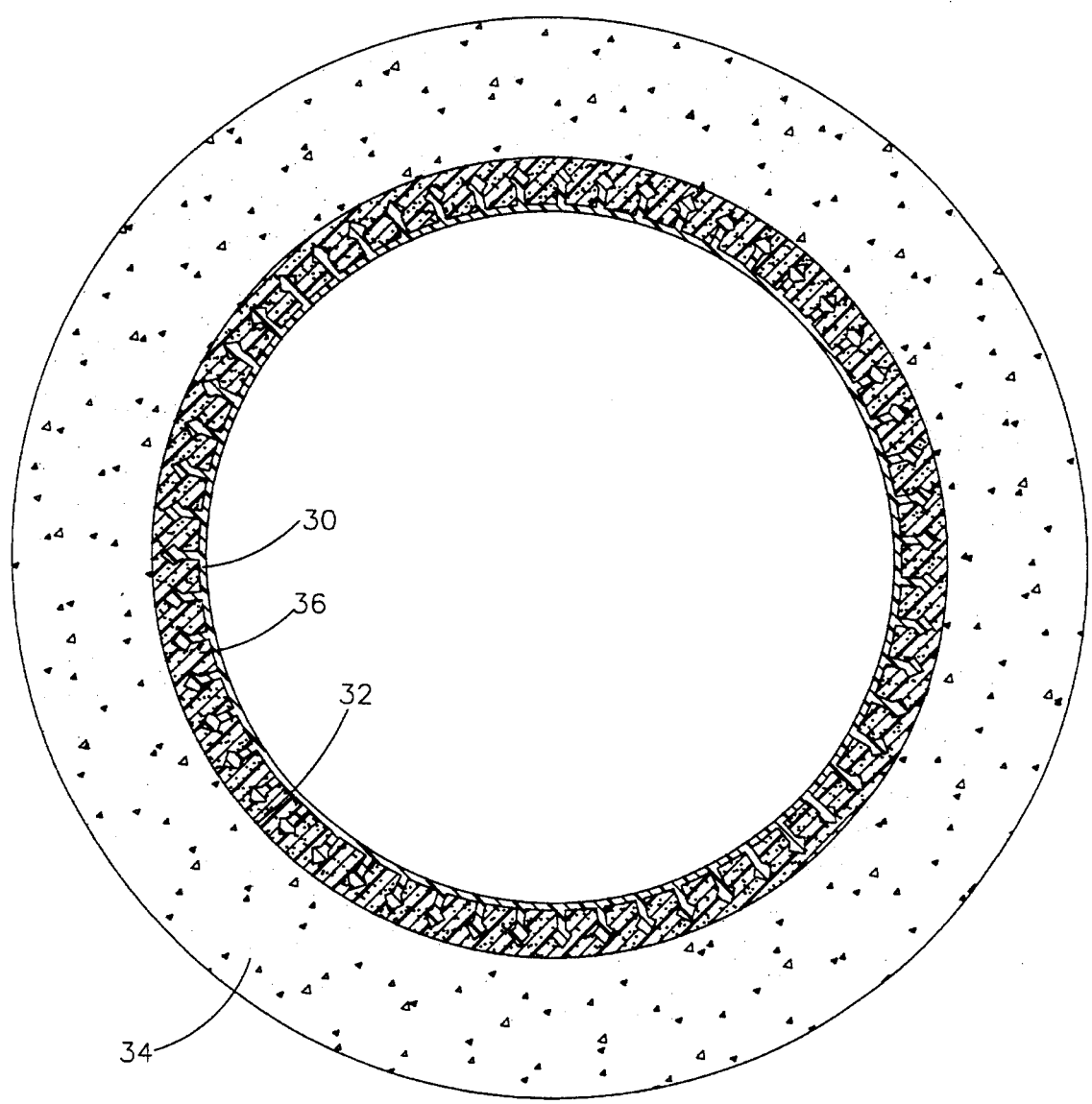
FIG. 4 is a cross-sectional side elevation of the flexible liner of FIG. I installed against an inside wall surface of a concrete pipe.

FIG. 4 illustrates the flexible liner 30 after it has been installed against a wall portion 32 of a concrete pipe 34, e.g., a sewer pipe. An intermediate adhesion layer or carrier 36 is applied to the wall portion 32 of the pipe in need of repair. A suitable carrier 36 can be formed from a resinous, cementitious, polymer, gel-like material that demonstrates good chemical and corrosion resistance upon curing to form a corrosion protective layer on the substrate surface, strong adherence to the underlying substrate material under a variety of different operating circumstances, and a strong thixotropic hold to the flexible liner upon initial contact, while temporarily remaining soft or gel-like to accommodate placement of the ribs therein during installation of the flexible liner. Other desired properties of the carrier is that it be capable of adhering uncured wet or very damp concrete, brick, and other surfaces that have been previously corroded and/or eroded.

It is desired that the carrier not slump on vertical surfaces and overhead surfaces, and be sufficient thixotropic to carry the weight of the flexible liner while curing. It is desired that the carrier be nontoxic, have low to zero volatile organic compounds, and be user friendly. It is also desired that the carrier be capable of curing within a short amount of time at ambient temperatures between 5° C. and 38° C. (40° F. and 100° F.). In a preferred embodiment, the carrier can cure or harden completely at room temperature (25° C.) in approximately one hour. The cure reaction of the carrier is exothermic and is influenced by the ambient temperature. Therefore, it is to be understood that the cure rate of the carrier will vary depending on the ambient temperature.

It is desired that the carrier cure to form a strong bond with the surface of the substrate but not with back side surface of the flexible liner so that the only mechanism retaining the flexible liner against the carrier is the mechanical lock that is formed between the ribs and the carrier. Although it is desired that the flexible liner adhere to the carrier upon initial contact, to eliminate the need for temporary structural support or props, the formation of a bond between the carrier and the flexible liner back is not desired so that the flexible liner can remain flexible with respect to and independent from the adjacent wall surface. This eliminates the possibility of the flexible liner cracking or tearing as a result of cracks that develop in the substrate 24 and that are transmitted from the wall portion 32 to the carrier 36. Constructed in this manner, the flexible liner 30 is better able to protect against fluid or gas leakage from the pipe due to the development of such pipe cracks. Additionally, the flexible liner is better able to prevent ingress of ground water into the pipe due to the development of such pipe cracks in applications where the pipe is buried at a depth equal to or below the ground water level. In such cases the ground water passing through the cracks in the pipe is trapped between the pipe wall section and the back side surface of the liner, and is thereby prevented from entering the pipe.

A suitable carrier material is a two-part epoxy resin comprising a resin component and a hardener or catalyst component. A preferred resin component may include reaction products from combining an epoxide with a phenol, such as epicholorohydrin and Bisphenol A. A preferred hardener or catalyst component may include an amine and alcohol such as tetraethylenepentamine and benzyl alcohol. It is desired that the carrier material also comprise an amount of extender in the form of calcium silicate, silica sand, hollow glass spheres and the like. Use of the extender is desired for economic reasons, to decrease the amount of resin and hardener component that is needed to cover a particular substrate portion, i.e., make a particular repair. A preferred extender is in the form of hollow glass spheres, and a preferred carrier may include in the range of from 5 to 30 percent by weight extender. However, it is to be understood that the carrier can be prepared and used without the extender is desired. A particularly preferred carrier is manufactured by Jeffco Products of San Diego, Calif. under the product number 9912.

Figure 5:
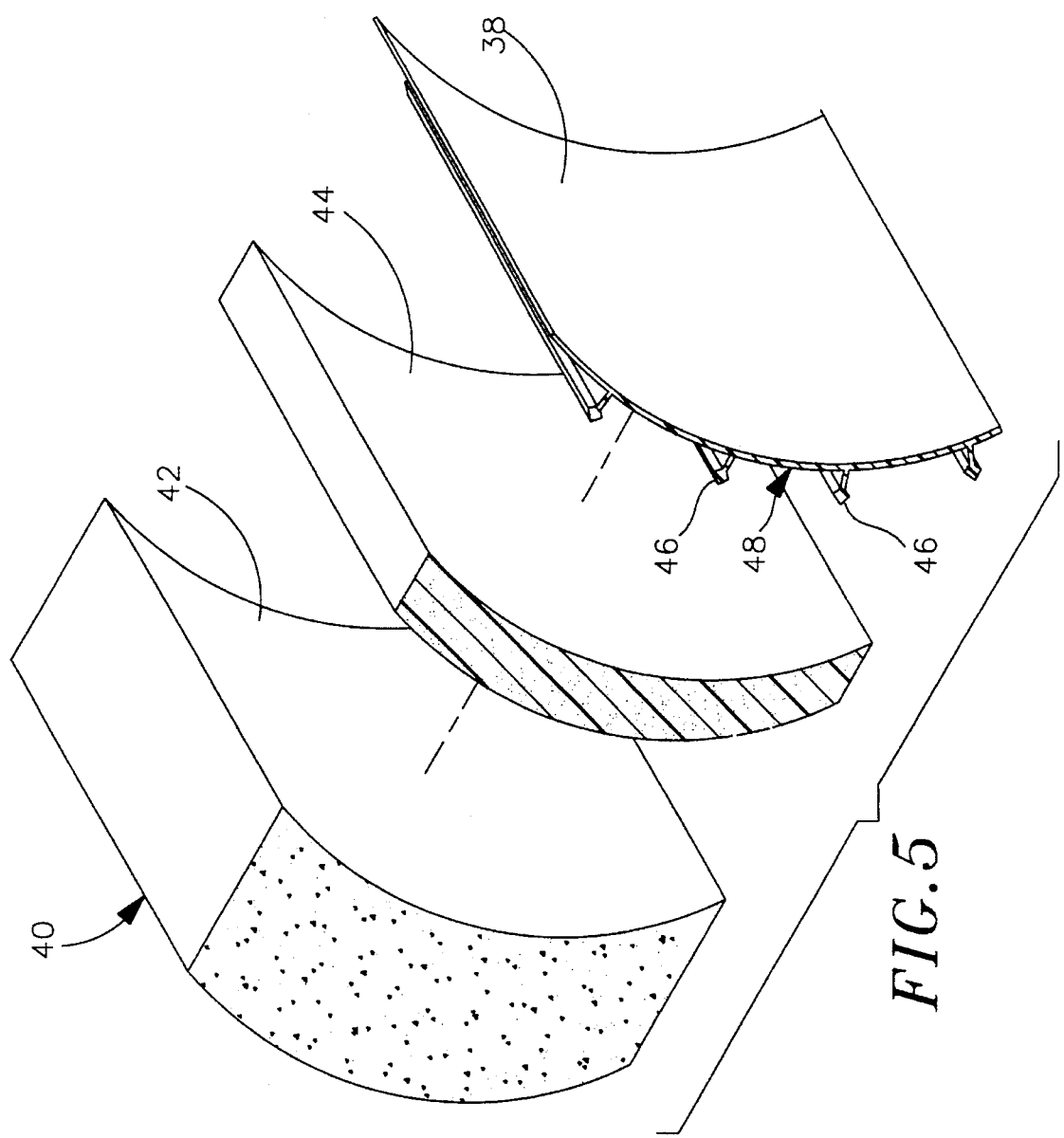
FIG. 5 is an exploded perspective view of the flexible liner of FIG. 1 being installed against an inside wall surface of a concrete pipe.

FIG. 5 illustrates a section of the flexible liner 38 as it is being installed within a pipe 40 to repair a corroded and/or eroded pipe wall section 40. The wall section 40 is first cleaned and then, if necessary, built up to its original wall thickness by applying mortar or other suitable concrete patch material. The intermediate adhesion layer or carrier 44 is applied to the wall section. The thickness of the applied carrier should be sufficient to accommodate the complete length of the ribs 46. The carrier 44 can be applied by conventional application techniques such as by hand application using a trowel and the like, or by pump application. Once the carrier is applied and adhered to the wall section 42 the liner 38 is placed with its back side surface 48 adjacent the carrier and is pressed against the carrier so that the ribs 46 projecting from the back side surface of the flexible liner are inserted into the carrier.

Alternatively, the carrier 44 can be applied to both the wall section 42 and the back side surface of the flexible liner 38, thereby eliminating the need to press the liner against the carrier to cause the ribs to enter the carrier. However, it is still necessary that the liner be pressed to some extent against the carrier on the wall section to ensure contact between the two adjacent carrier portions. Once the flexible liner is pressed into the carrier, the thixotropic qualities of the carrier serve to hold the liner into place, allowing the user to release the liner after being pressed into place and eliminating the need to use external supports, forms, or props and the like.

The flexible liner and method for applying the same can be used to surface or rehabilitate an entire circumferential wall section of a damaged pipe (as shown in FIG. 4) or can be used to repair only a discrete section along the pipe wall. The flexible liner can be configured in the size needed to accommodate a particular surfacing or rehabilitation application from one sheet or from a number of smaller liner sheets that are either joined together by conventional techniques, such as by adhesive or hot air welding in the field or by dielectric welding at the point of manufacture. Although the flexible liner and method for applying the same has been described and illustrated for use in surfacing or rehabilitating concrete substrates, e.g., sewer pipes and the like, it is to be understood that the flexible liner and method of this invention may be used to surface or rehabilitate non-concrete structures as well such as brick and other masonry structures.

Although limited embodiments of the device and method for surfacing or rehabilitating structures have been described herein, many modifications and variations will be apparent to those skilled in the art. Accordingly, it is to be understood that, within the scope of the appended claims, the device and method for surfacing or rehabilitating structures may be embodied other than as specifically described herein.

What is claimed is:

1. A method for repairing a structure comprising the steps of:

applying an intermediate adhesion layer to a surface portion of the structure;

placing a surface portion of a flexible liner against the intermediate layer so that ribs projecting outwardly away from the surface enter and are completely encapsulated by the intermediate adhesion layer, wherein each rib is configured with an end having an enlarged profile, and where the intermediate layer and surface portion of the flexible liner are adapted to temporarily adhere to one another upon initial contact; and forming a mechanical lock between the ribs and the intermediate adhesion layer by action of the intermediate adhesion layer curing, wherein the surface portion of the liner is positioned adjacent the intermediate adhesion layer and is not adhered thereto by curing.

2. A method as recited in claim 1 comprising forming a chemically resistant protective layer on the surface portion of the structure by applying an intermediate adhesion layer having chemically resistant properties after curing.

3. A method as recited in claim 1 comprising forming the mechanical lock by curing the intermediate adhesion layer at ambient temperature for approximately one hour.

4. A method as recited in claim 1 comprising repairing a structure without the use of external support to hold the liner into place during the steps of placing the liner against the intermediate adhesion layer, and forming a mechanical lock.

5. A method for surfacing or rehabilitating a structure without using forms or props for support, the method comprising the steps of:

applying an intermediate adhesion layer to a surface portion of the structure;

positioning a back side surface of a flexible liner against the intermediate adhesion layer, wherein the back side surface of the liner includes a number of ribs that each project outwardly distance away from the liner;

pressing the flexible liner against the intermediate adhesion layer to cause the ribs to enter and be surrounded by the intermediate adhesion layer; and forming a mechanical lock between the ribs and the intermediate adhesion layer, wherein the intermediate adhesion layer is adapted to form a strong bond with the surface portion of the structure but not with the back side surface of the flexible liner when fully cured.

6. A method as recited in claim 5 comprising forming a mechanical lock between the intermediate adhesion layer and end portions of the ribs that are configured having an enlarged profile to resist outward travel from the adhesion layer and facilitate formation of the mechanical lock.

7. A method as recited in claim 5 comprising forming the mechanical lock between the ribs and intermediate adhesion layer by action of the intermediate adhesion layer curing.

8. A method for surfacing or rehabilitating a structure comprising the steps of:

applying an intermediate adhesion layer to a surface portion of the structure;

inserting ribs that project from a back side surface of a flexible liner into the intermediate adhesion layer, wherein the ribs are configured having end portions with an enlarged profile to facilitates retention of the ribs within the intermediate adhesion layer;

forming a strong bond between the intermediate adhesion layer and the surface portion of the structure but not to the back side surface of the liner by action of the intermediate adhesion layer curing; and forming a mechanical lock between the ribs and the intermediate adhesion layer by action of the intermediate adhesion layer curing.

9. A method as recited in claim 8 comprising applying an intermediate adhesion layer that is strongly adhesive to retain the liner in place against the intermediate adhesion layer without use of external supports after the step of inserting the ribs.

10. A method as recited in claim 8 comprising forming a chemically resistant protective layer on the surface portion of the structure by applying an intermediate adhesion layer having chemically resistant properties after curing.

* * * * *